United States Patent [19]

Gerow

[11] 4,326,926
[45] Apr. 27, 1982

[54] METHOD OF DISTILLING A VOLATILE CONSTITUENT FROM A LIQUID MIXTURE

[75] Inventor: Gordon P. Gerow, Davenport, Fla.

[73] Assignee: FMC Corporation, Chicago, Ill.

[21] Appl. No.: 865,150

[22] Filed: Dec. 28, 1977

Related U.S. Application Data

[62] Division of Ser. No. 399,238, Sep. 20, 1973, Pat. No. 4,113,573.

[51] Int. Cl.³ ............................................. B01D 3/06
[52] U.S. Cl. ........................................ 203/91; 203/92
[58] Field of Search ................... 159/2 R; 202/205; 203/91, 92, 96

[56] References Cited

U.S. PATENT DOCUMENTS

| | | | |
|---|---|---|---|
| 2,500,194 | 3/1950 | McIonnell et al. | 202/48 |
| 2,956,887 | 10/1960 | Lund | 99/205 |
| 3,219,549 | 11/1965 | Prahl et al. | 203/91 |
| 3,409,515 | 11/1968 | Bair et al. | 203/49 |
| 3,453,184 | 7/1969 | Gesmassher et al. | 159/2 R |
| 3,469,617 | 9/1969 | Palmason | 159/47 |

FOREIGN PATENT DOCUMENTS 22648 11/1970 Australia .

Primary Examiner—Hiram Bernstein
Attorney, Agent, or Firm—Richard B. Megley

[57] ABSTRACT

A steam stripping process particularly useful for separating the volatile components of immiscible materials. In the disclosed embodiment of the invention peel oil emulsion, e.g., from a citrus juice extractor, is heated under pressure by the injection of steam while the emulsion is flowing. The major portion of the pressure on the flowing emulsion is then dropped through a back pressure valve, and the resultant vapor-liquid mixture is passed through a long turbulent passage under a slowly decreasing pressure where thorough mixing is provided and d-limonene, the volatile component of the peel oil emulsion, is stripped from the emulsion by the ad-mixed steam. The mixture is discharged at atmospheric pressure into a vapor collecting tank where the spent liquor is separated and drained off. The collected vapors are passed to a condenser, and the condensate therefrom is directed to a decant tank where the d-limonene is decanted off.

2 Claims, 7 Drawing Figures

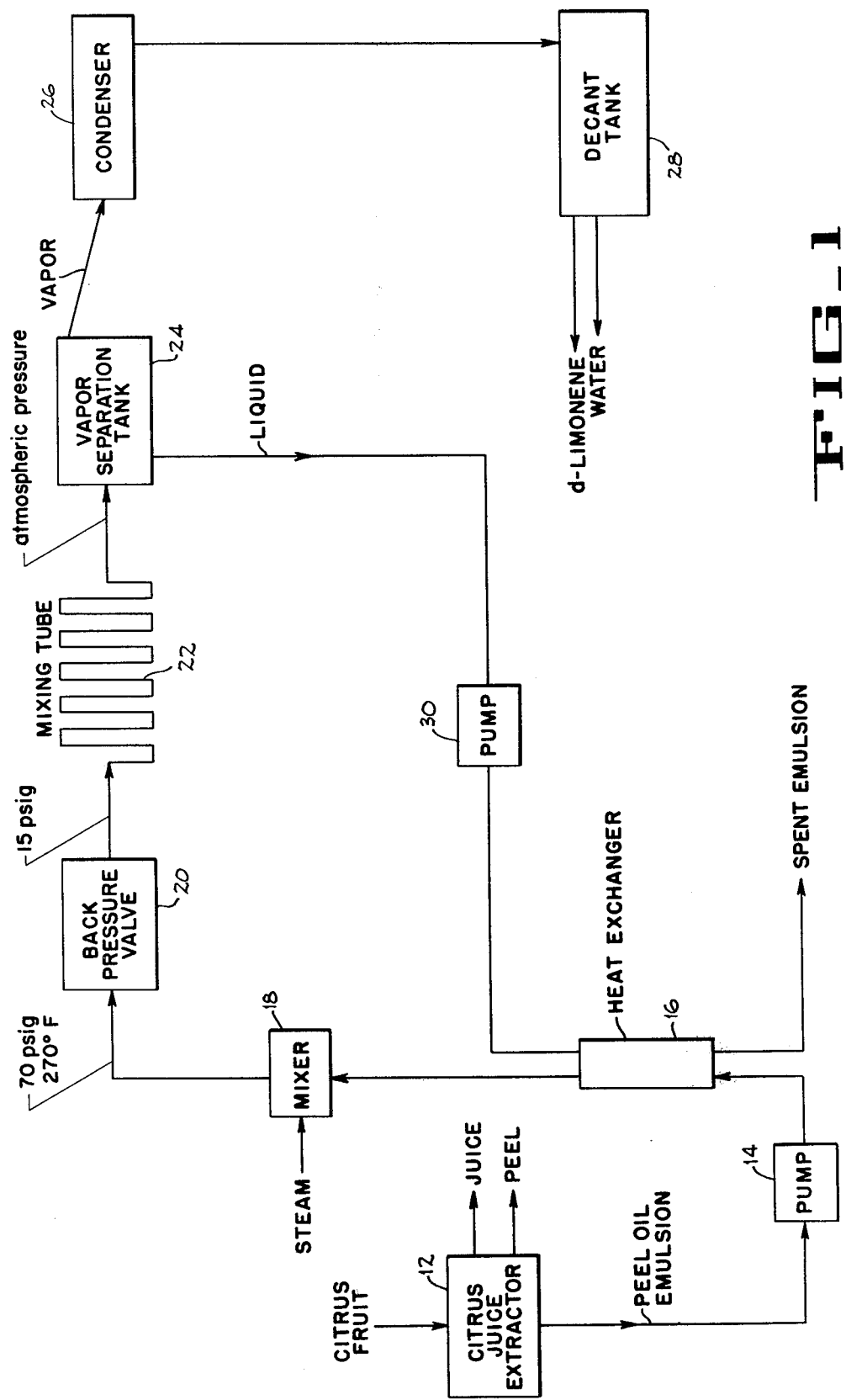
FIG_1

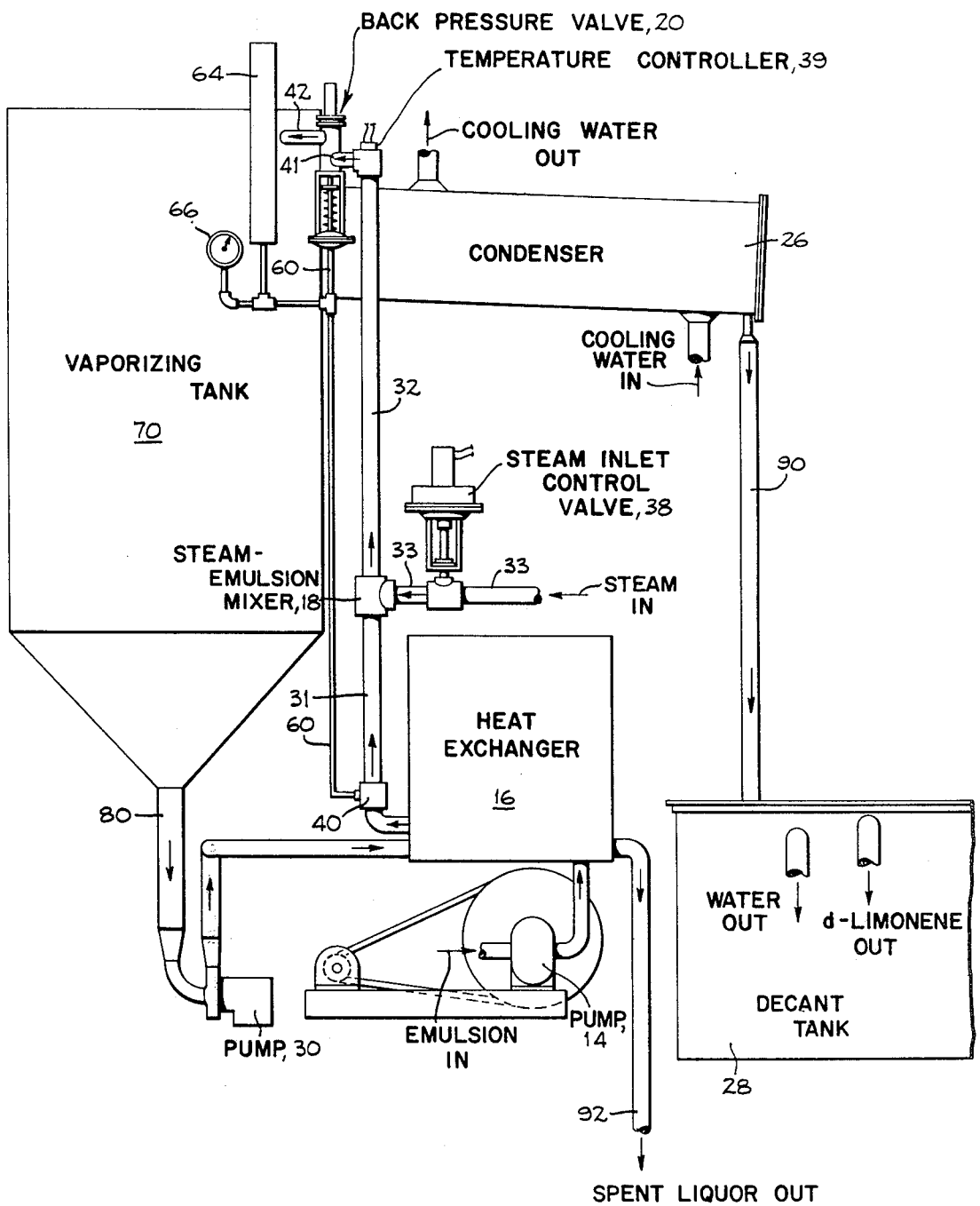

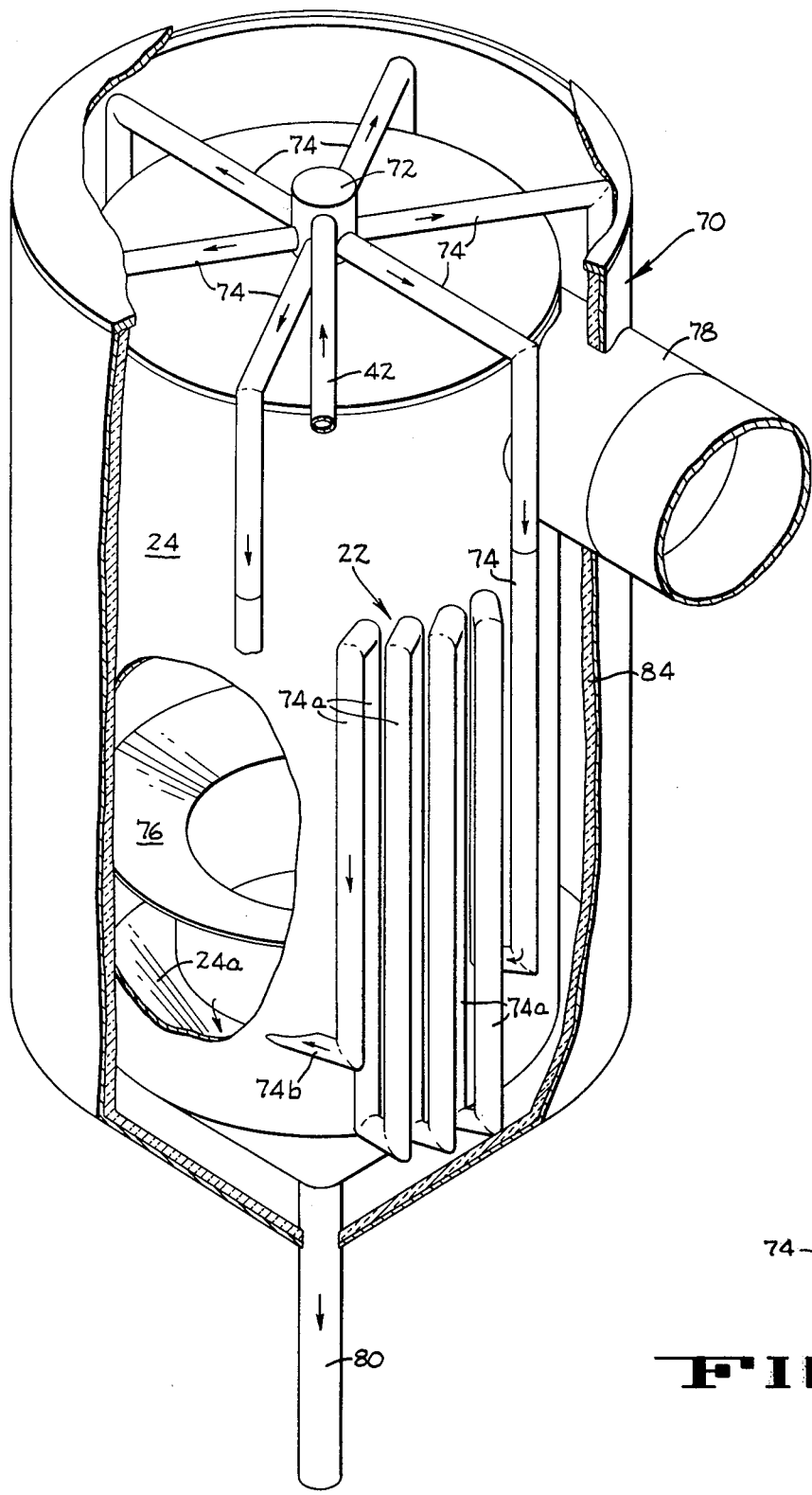

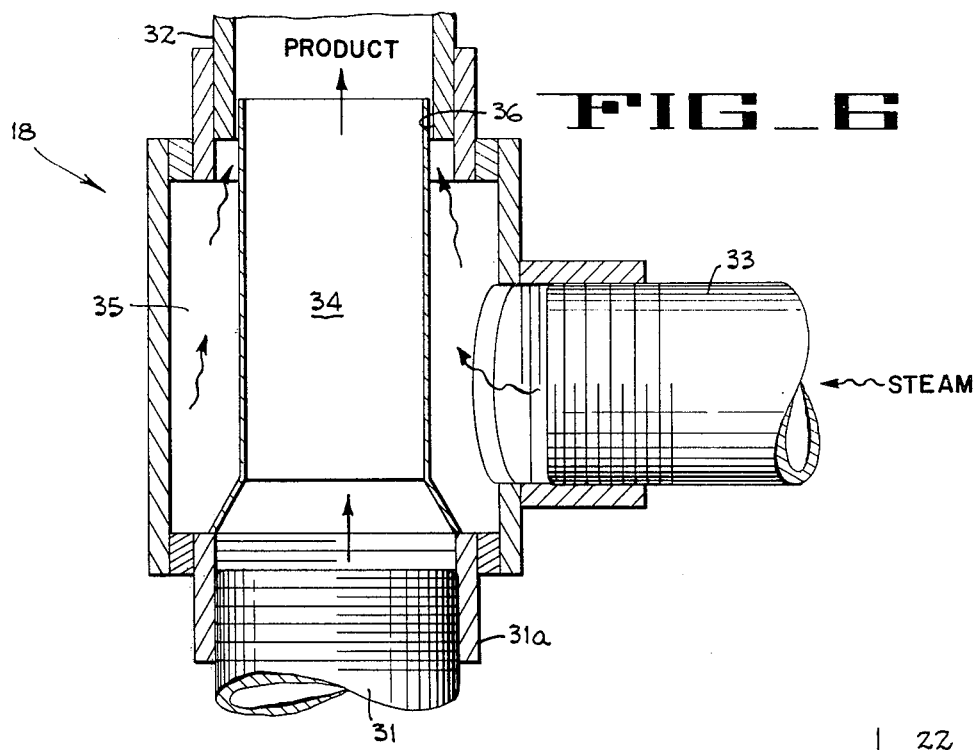
FIG_6
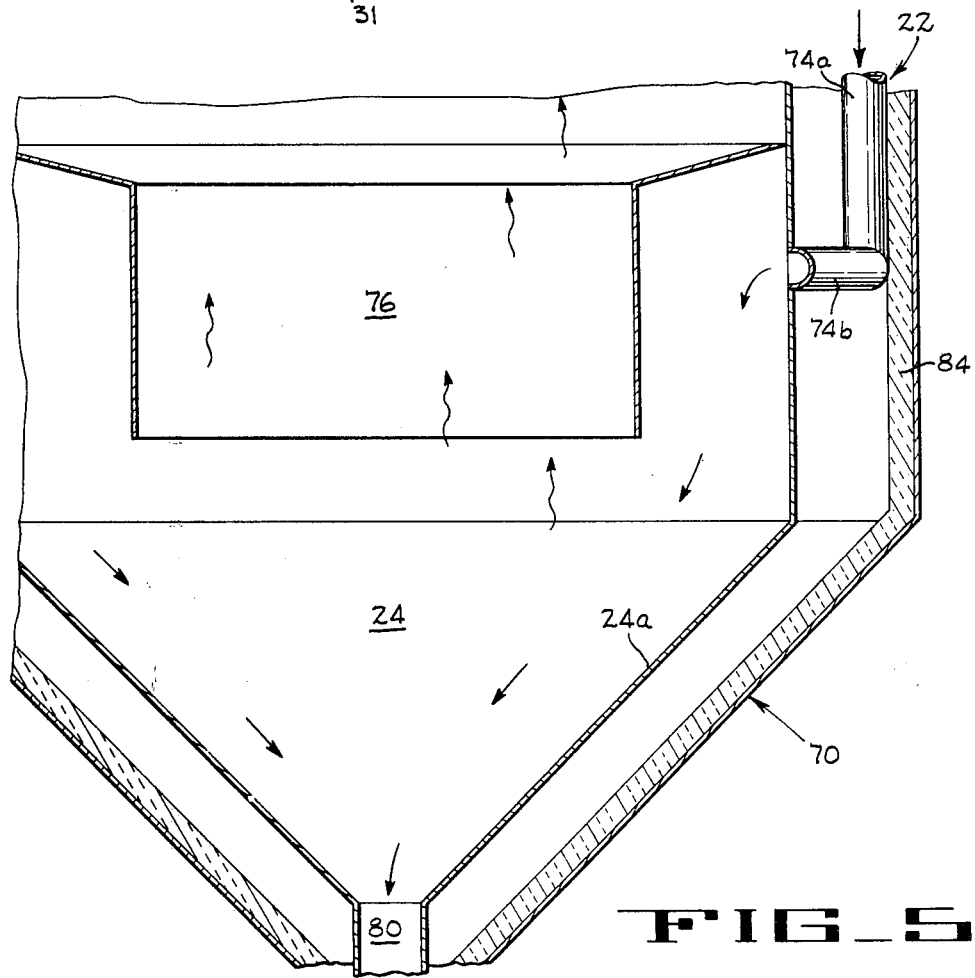
FIG_5

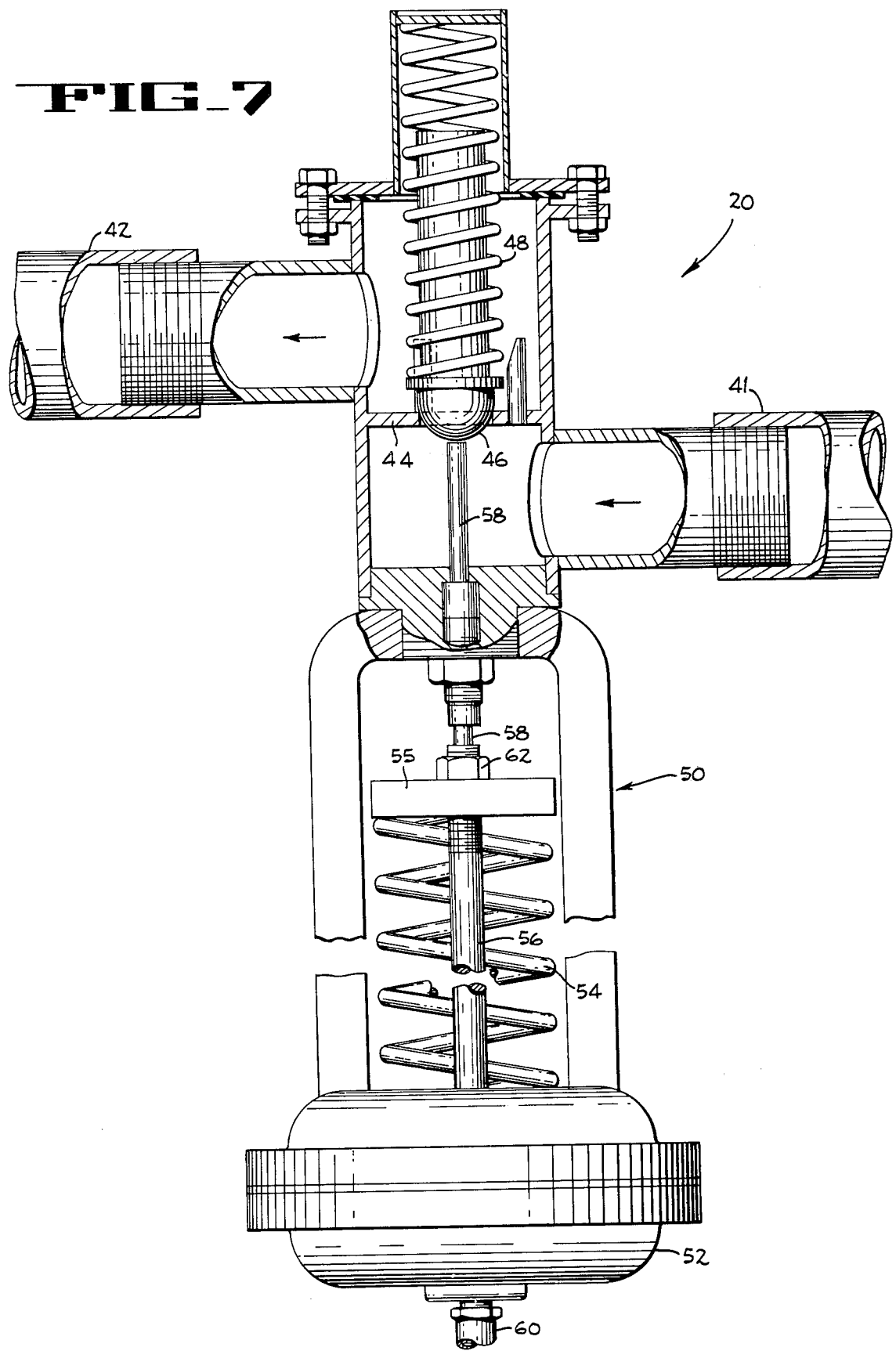

METHOD OF DISTILLING A VOLATILE CONSTITUENT FROM A LIQUID MIXTURE

This is a division, of application Ser. No. 399,238 filed Sept. 20, 1973, now U.S. Pat. No. 4,113,573.

BACKGROUND OF THE INVENTION

1. Field of the Invention

The present invention pertains to methods and apparatus for separating a volatile constituent from a liquid mixture, and more particularly, it pertains to methods and apparatus for steam stripping liquid mixtures in a continuous operation in order to extract a volatile constituent thereof.

2. Description of the Prior Art

Steam distillation, or steam stripping, is a well known process in which vaporization of the volatile constituents of a charge of liquid material is effected at a lowered temperature by the introduction of steam directly into the charge. Steam stripping is normally used where the constituents to be separated are not sufficiently volatile to vaporize under normal controlled heating conditions. Typical steam stripping installations of the prior art include the vertically arranged packed columns or plate columns wherein the liquid feed material is inserted under equilibrium conditions into the column where countercurrent flow provides a continuous separation of the vapor and liquid phases of the material. The columns normally contain a plurality of rings, plates, or other forms of baffles so as to provide a maximum number of turbulence producing and mixing surfaces. Steam is bubbled up from the bottom of the tank to provide a thorough mixing and vapor-stripping of the material in the column, and the vapors are removed at the top of the column while the spent liquor is continuously drained off at the bottom of the column. A duel-stage steam stripping apparatus for recovering vegetable oils from an oil and solvent solution of hot miscella is shown, for example, in prior U.S. Pat. No. 3,503,854 to Good.

The aforementioned steam stripping apparatus and processes of the prior art, however, are not always ideally efficient where the material to be separated comprises an emulsion and, particularly, where the volatile constituent may be entrained in fine particulate matter in the emulsion. A typical example of an emulsion which cannot be readily separated with normal steam stripping apparatus without long exposure times and the additions of excessive amounts of steam is a citrus peel oil emulsion as obtained from a citrus juice extractor of the type shown, for example, in the prior U.S. patent to Robbins et al, U.S. Pat. No. 3,717,084. In the juice extracting machine shown in this patent, the juice is extracted from citrus fruit, such as oranges, by compressing the fruit between a pair of cups formed with a plurality of interdigitating fingers. One of the cups is provided with a central tube to receive the juice while the peel is scored and pushed through the fingers with the peel oil being discharged therefrom in the process. Washing sprays are used to wash the oil from the peel and from the air, and the resulting peel oil emulsion is directed away from the juice extracting machine.

The major constituent of the essential oil present in citrus fruit peels is known as d-limonene and is useful in making dipentene resins such as turpentine. Approximately 95% of the essential oil in oranges, for example, is d-limonene. With the juice extractor of the aforementioned United States patent to Robbins et al, a water-peel oil emulsion is produced containing about 3-5% by volume of d-limonene with the d-limonene being immiscible in the water. In addition to the d-limonene, the emulsion also contains some coluble solids, mostly sugars and pectins, and insoluble solids in the form of fine pulp particles or bits of peel.

Methods of recovering the d-limonene from the peel oil emulsion have included centrifuging, but the amount of d-limonene recoverable by this type of process is limited. Other prior art suggested methods for recovering the essential oils from the citrus peel oil emulsion have included various more or less conventional steam stripping operations as disclosed, for example, in the U.S. Pat. No. to Pulley 2,471,893 or the article by Messrs. Veldhuis et al in the Journal of Food Science, Volume 37, pages 108–112 (1972). In the patented steam stripping system citrus waste press water is heated to some 215° F. to 250° F., or higher, and is then passed through a holding chamber under sufficient pressure so as to prevent boiling with the retention time of the material in the chamber being about 10 seconds. The press water is flash discharged from the holding chamber into a flash tank through a spray nozzle. In the flash tank steam is introduced into the emulsion with the vapors being collected, condensed and directed to a decant tank where the essential citrus oil is separated from the water. In the process disclosed in the Veldhuis et al article, citrus waste water is directed into a conventional steam stripping column and the vapours therefrom are directed into a reflux condenser and a chilling condenser with the condensate therefrom being delivered to an oil separator.

Other prior art steam stripping processes which have been performed upon fruit juices for recovering volatile constituents thereof are disclosed in an article by A. H. Brown et al in Industrial & Engineering Chemistry, Volume 43, No. 12 (1951). In a process disclosed in this article, the fruit juice material is heated and fed to a steam injection heater. The resultant steam-liquid mixture is then directed to a six-foot, steam-jacketed tubular evaporator before being flashed into a flash tank where the vapor is separated from the liquid, condensed and separated in the conventional manner.

SUMMARY OF THE INVENTION

By the present invention a unique process is provided which is particularly useful for separating volatile constituents of immiscible materials which are not otherwise readily separated by such distillation processes other than with long exposure times and with great excesses of steam. The method of the present invention generally comprises, in its preferred form, the injection of live steam into the continuously flowing liquid mixture in order to raise the temperature of the mixture while it is under a relatively high pressure. The mixture is then directed through a long confined passage with a plurality of protuberances therein while the pressure is being continuously decreased in order to provide continuous vaporization and a very thorough mixing to achieve better separation of the volatile components of the mixture. In the preferred form of the invention a back pressure valve is used between the steam injection means and the long turbulent passage in order to provide rapid vaporization of the material and virtually explode the various solid components in the mixture— thus aiding in releasing the volatile constituents therefrom. At the end of the turbulent passage the mixture is flashed into a more or less conventional vapor separation tank where the vapors are directed to a condenser and then to a decant tank for final water-oil separation.

While, in the preferred operation, live steam is injected into the liquid material to be separated it is possible to use one of the components of the material as the vaporizable component which strips the volatile component from the remainder of the material.

The aforedescribed steam stripping process has been found to be particularly useful in separating d-limonene from a citrus peel oil or waste water emulsion such as might be recovered from a citrus juice extractor or from citrus peel oil presses.

With the method of the present invention d-limonene has been stripped from peel oil emulsion at or near theoretical steam consumption rates, and the percentage removal of the d-limonene from the emulsion has been very close to 100%. Furthermore, the recovered d-limonene is substantially odor-free whereas other commercial d-limonene extraction processes produce a d-limonene product with a fruit odor or with a distinct burned odor.

BRIEF DESCRIPTION OF THE DRAWINGS

FIG. 1 is a block diagram illustration of the steam stripping process and apparatus of the present invention.

FIG. 2 is a diagrammatic representation of the steam stripping system of the present invention.

FIG. 3 is a diagrammatic isometric view of the vaporizing tank of the present invention with portions thereof being broken away for the purpose of clarity.

FIG. 4 is an enlarged isometric detail view of a section of one of the mixing conduits in the vaporizing tank of FIG. 3 with a portion thereof being broken away in order to illustrate the turbulence-producing structure of the interior passage.

FIG. 5 is an enlarged partial vertical section taken through the lower end of the vaporizing tank of FIG. 3.

FIG. 6 is an enlarged section through the steam-emulsion mixing valve shown in FIG. 2.

FIG. 7 is an enlarged section through the back pressure valve shown in FIG. 2.

DESCRIPTION OF THE PREFERRED EMBODIMENT

The process and apparatus of the present invention will be specifically described with reference to the separation of d-limonene from citrus peel oil emulsion. However, it will be understood that the method and apparatus of the present invention may find utility in any other steam distillation processes wherein a volatile constituent is to be separated from liquid materials. The process of the present invention is particularly useful wherein the material to be stripped is contained in a highly stable emulsion and wherein portions of the material to be stripped are contained within small particulate matter in the emulsion. Furthermore, while the process of the present invention will be described as a steam stripping process wherein live steam is injected into the immiscible materials, it will be recognized that the use of vaporizable carriers other than steam is possible. Furthermore, the steam does not have to be injected but may exist in the immiscible materials whereby the application of a sufficient amount of heat alone will provide the vaporizing carrier for stripping another volatile constituent from the material.

As pointed out, the process of the present invention has been found to be particularly useful in separating d-limonene from a citrus peel oil emulsion. This process is shown diagrammatically in FIG. 1. The peel oil emulsion used in the process of the present invention was obtained from a citrus juice extractor 12 particularly designed to separately recover peel oil such as the extractor shown in the prior patent to Robbins et al, U.S. Pat. No. 3,717,084. In the device disclosed in this patent juice extracting cups compress and score the peel of the citrus fruit and force it through narrow passageways in the cups. The juice and peel are separately recovered (as shown in FIG. 1). During the aforedescribed operations on the peel the peel oil is released from the peel cells, and wash sprays are used to remove the expelled peel oil from the atmosphere and to wash it from the peel and pulp. This peel oil-water emulsion material is then screened to provide the base material from which the d-limonene is to be extracted. With the process of the present invention the peel oil emulsion is passed through screens having perforations of 0.020 inch dimensions before being directed to the separation apparatus.

The cold peel oil emulsion, after screening, is passed to a pump 14 (FIG. 1) having sufficient capability to provide the necessary back pressure on the downstream end thereof as will be explained in greater detail hereinafter. The liquid material from the pump 14 is next passed through a heat exchanger 16 wherein a sufficient amount of heat is added to the material to bring the temperature thereof up to around 200°-214° F. Immediately after the material is heated in the heat exchanger, live steam is injected therein by a mixing valve 18 to add additional heat thereto to bring the temperature of the emulsion up to about 270° F. This emulsion is then passed through a back pressure valve 20 where the pressure thereof is dropped from about 70 psig to about 15 psig. This drop in pressure instantly vaporizes the steam in the emulsion and has an explosive effect upon the small particles of peel and pulp in the emulsion so as to aid in allowing the entrained d-limonene constituent to be stripped therefrom.

The vapor stripping operation basically occurs in a mixing tube 22 which provides a long confined turbulent passage in which the steam has a residence time of about five seconds. The liquid material, which clings to the sidewalls of the passage, has a somewhat longer residence time. The particular structure and function of this mixing tube will be described in greater detail hereinafter. During passage through the mixing tube the superatmospheric pressure on the emulsion and admixed steam is reduced from about 15 psig to atmospheric pressure which is the pressure existing in a vapor separation tank 24 at the outlet of the passage through the mixing tube. The vapors in the tank 24, at a temperature of about 214° F., are collected and directed to a condenser 26 which condenses them and directs the condensate to a decant tank 28, both the condenser and decant tank being entirely conventional items in typical commercial steam stripping systems. In the decant tank the lighter d-limonene constituent is allowed to separate from the heavier water constituent and is decanted off.

The material remaining in the liquid phase in the vapor separation tank 24 is drained off to a pump 30 which pumps it through the heat exchanger unit 16 thus providing the heat for the initial heating of the cold emulsion. After passing through the heat exchanger the spent emulsion may be discarded.

The specific apparatus for accomplishing the process of the present invention is diagrammatically shown in FIG. 2. As pointed out previously, the emulsion is passed from the pump 14 through the heat exchanger 16 to the mixing valve 18 at which point the temperature thereof should be in a range of from about 200°–214° F. depending upon the efficiency of the heat exchanger and the heat losses occurring during transport of the spent emulsion from the vapor separation tank 24 to the heat exchanger. At the mixing valve, the emulsion is mixed with high pressure steam. The structure of the mixing valve is shown in detail in FIG. 6 wherein it will be seen that the heated emulsion product is passed from an inlet pipe 31 to an outlet pipe 32 in a straight line flow via a slightly restricted passage through a nozzle member 34. This cylindrical member is welded at its upstream end to a fitting 31a to which the pipe 31 is threaded. Steam from a steam inlet line 33 is injected into an enlarged housing 35 of the mixing valve which surrounds the nozzle member 34. From this housing the steam is injected into the pipe 32 through a small annular passage 36 surrounding the outlet end of the cylindrical nozzle member. Thus, the steam is injected tangentially about the product flow.

As shown in FIG. 2, the steam inlet line 33 is provided with a control valve 38 which is an entirely conventional pneumatically operated process control valve serving to limit the amount of steam injected into the emulsion. This pneumatically operated valve is controlled by the temperature of the emulsion at the downstream end of the mixing valve 18 which temperature is sensed by a temperature controller 39 at the upper end of outlet pipe 32 just ahead of the back pressure valve 20. In practicing the process of the present invention with a citrus peel oil emulsion in the system the temperature sensed by controller 39 should be maintained generally in the range of from about 270° F. to about 275° F. although acceptable results have been obtained with the temperature being in a range of from about 250° F. to about 280° F. The steam, at about 150 psig, is directed through the steam inlet control valve 38 into the mixing valve 18, and, at the heretofore mentioned temperature and pressure of the peel oil emulsion in the pipe 32, the steam will be condensed so that a totally liquid mixture is provided at the back pressure valve 20. While this condensation of the steam is not absolutely necessary, it is useful since it provides a means for achieving control of the pressure and temperature conditions prior to the back pressure valve—such conditions being critical in achieving the desired stripping results.

A check valve 40 is provided just downstream of the heat exchanger 16 on the inlet pipe 31 the function of which is to prevent the steam in the steam inlet line 33 from driving the pump out of control in the reverse direction in the event that there is a pump failure.

The back pressure valve 20 provides an important function in the apparatus of the present invention by rapidly reducing the pressure of the steam-emulsion mixture to vaporize the steam component thereof and initiate the stripping operation. The structure of the back pressure valve is shown in detail in FIG. 7 wherein it will be seen that the mixture is directed from an inlet conduit 41 to an outlet conduit 42 through a passage in a valve plate 44 which is adapted to be closed by a valve plug element 46. The valve plug element is mounted upon a compression spring 48 which provides about 150 psi compression to maintain the plug element in the valve seat unless it is unseated by an operator 50. This compression spring 48 also acts as a relief spring to allow the valve to open under a predetermined upstream pressure of 150 psi in the event that the operator 50 is malfunctioning. The conventional diaphragm operator 50 includes an outer chamber 52 having a hydraulically actuated diaphragm therein (not shown). The diaphragm is counterbalanced by a compression spring 54 which is set at the pressure at which the material on the upstream side of the back pressure valve is to be maintained. In the described system this pressure is ideally about 70 psig although useful results have been obtained with the pressure as low as 50 psig. The compression spring 54 is mounted upon a platform 55 which is rigidly secured to the frame of the operator by a pair of support rods 56 (one only being shown in FIG. 7). Attached to the diaphragm and extending longitudinally through the operator is an operating stem 58 which, in the unactuated or neutral position of the operator, is adapted to just clear the end of the valve plug element 46, as is shown in FIG. 7. The hydraulic pressure side of the diaphragm is connected to a small pressure line 60 which is, in turn, connected to the emulsion inlet pipe 31 (FIG. 2) at the check valve 40. This line 60 thereby senses the upstream pressure on the back pressure valve 20 and maintains this pressure at a predetermined value as set by the amount of compression in the spring 54. As shown in FIG. 7, this compression may be adjusted by loosening the nuts 62 and adjusting the position of the reaction platform 55 upon the support rods 56. The pressure sensing line 60 is connected to the emulsion inlet line upstream of the steam inlet line 33 so that the fluxuating pressures caused by the injected steam do not adversely affect the control at the back pressure valve. Furthermore, an air ballast tank 64 (FIG. 2) is provided in the pressure sensing line 60 to further smooth out any pressure variations therein which might be particularly due to the pulsating steam injection. A gauge 66 is attached adjacent to the ballast tank so that this upstream pressure, which is critical to the operation of the process, can be readily checked.

An important feature of the apparatus of the present invention is a vaporizing tank 70 to which the emulsion-steam mixture is directed. This vaporizing tank 70 comprises both the mixing tube 22 and the vapor separation tank 24 shown schematically in FIG. 1. The structure of the vaporizing tank is shown in detail in FIG. 3 and FIG. 5. From FIG. 3 it will be seen that the mixture in conduit 42 from the back pressure valve 20 is directed to a manifold 72 where it is split into six separate portions and directed outwardly into six mixing pipes 74 to the outer portion of the tank. The pipes 74 collectively comprise the mixing tube 22 portion of the apparatus, and each of these pipes is angled downwardly at the sidewall of the tank and includes a relatively long, continuous forty-foot flow section comprised of a plurality of end-to-end interconnected, parallel arranged vertically extending segments 74a. The vapor separation tank 24 is comprised of a separate tank located inside of and spaced from the walls of the vaporizing tank 70, as shown in FIG. 3. It should be noted that the dimensions of the vaporizing tank 70 are approximately 10 feet high and 5 feet wide in the illustrated embodiment of the invention, and hence, the 40 foot dimension of each of the pipes 74 is relatively long in contrast with the dimensions of the vaporizing tank or the vapor separation tank which is contained therein. The lower end of each of the mixing pipes 74 includes a short horizontally extending segment 74b the outlet end of which is directed into the lower end of the vapor separation tank. The liquid-vapor mixture which is injected into the separation tank 24 includes vapors which pass under a cylindrical baffle 76 (FIG. 5) and are directed upwardly to an outlet pipe 78 for passage to the condenser 26. The spent emulsion is received on the lower downwardly sloping walls 24a of the tank 24 and is drained by a vertical discharge line 80. The outer wall of the vaporizing tank 70 is provided with insulation 84 to prevent heat losses from the material being processed therein.

As pointed out hereinbefore, a special feature of the present invention is the mixing tube 22 which is comprised of the several separate conduits 74. Each conduit comprises a 2½ inch O.D. pipe with a 2⅜ inch I.D. and is formed with a series of interconnected vertical segments 74a to provide a relatively long passage for the emulsion from the manifold 72 to the outlets at the lower end of the tank 24. Each of the conduits 74 thereby restricts the flow and further includes an interior coil 88 formed of ⅛ inch wire and positioned in engagement with the cylindrical walls of the conduit passage as shown in FIG. 4. These coils provide considerable turbulence in the conduits and aid in achieving a complete mixing of the steam with the emulsion during the stripping phase of the process.

As stated previously the collected vapors from the separation tank 24 are directed out the pipe 78 to the condenser 26 which may be a conventional shell and tube condenser provided with continuously circulating cooling water as shown in the diagrammatic illustration of FIG. 2. The condensate from the condenser is directed through a vertical discharge pipe 90 to a decant tank 28 wherein the light d-limonene fraction is decanted out.

Further as shown in FIG. 2, the spent emulsion is directed from the discharge line 80 to the pump 30 which pumps it through the heat exchanger 16 before it is discharged in a line 92. The hot spent emulsion from the vaporizing tank 70 thereby provides the heat for heating the cold peel oil emulsion prior to injecting the steam therein and thus increases the efficiency of the operation.

As an example of the results obtained by the aforedescribed process and apparatus when treating orange peel oil emulsion for the extraction of d-limonene, attention is directed to Table I which provides, in tabular form, the results of 17 separate tests performed while the process was in continuous operation using orange peel oil emulsion as provided by orange juice extractors of the type disclosed in the aforementioned U.S. patent to Robbins et al. It can be seen that with a controller temperature in the 270°–275° F. range a recovery of 99% of the d-limonene in the emulsion was achieved with a steam/d-limonene ratio of about 12 to 1. In Test No. 5, for example, with a feed rate of 302 lbs. of emulsion/min., a spent liquor rate of 339 lbs./min., and a steam rate of 65 lbs./min., 21.8 lbs./min. of condensed water was obtained and 5.8 lbs./min. of d-limonene. The weight ratio of water to d-limonene was notably low at 3.8, and the d-limonene recovery was 94% measured as percent recovery from the effluents.

From the foregoing description it will be seen that the process and apparatus of the present invention provide a highly efficient method for steam stripping the volatile constituent of immiscible materials with a minimum amount of steam and in a minimum period of time. The apparatus is relatively simple and contains few expensive control devices. Such apparatus is therefore capable of being constructed at a low cost and will be seen to require only a minimum amount of maintenance in the operation thereof.

Although the best mode contemplated for carrying out the present invention has been herein shown and described, it will be apparent that modification and variation may be made without departing from what is regarded to be the subject matter of the invention.

TABLE I

| Test No. | Controller Temperature (°F.) | Oil Emulsion Feed Rate (Gal./Min.) | Steam ratio (Lb. Steam/ Lb. d-Limonene) | Weight Ratio of Condensed Water to d-Limonene Collected (Lb. Water/Lb. d-Limonene) | Average d-Limonene Content of Feed (Percent W/W) | Average d-Limonene Content of Spent Liquor (Percent W/W) | Approximate % Recovery of d-Limonene (Percent) |
|---|---|---|---|---|---|---|---|
| 1 | 245–250 | 37 | 12.3 | 3.8 | 2.6 | 0.27 | 85 |
| 2 | 255–260 | 46 | 10.3 | 2.7 | 2.1 | 0.20 | 90 |
| 3 | 270–275 | 36 | 11.0 | 3.8 | 2.2 | 0.08 | 94 |
| 4 | 270–275 | 36 | 10.0 | 3.3 | 2.0 | 0.09 | 96 |
| 5 | 270–275 | 36 | 11.2 | 3.8 | 1.9 | 0.10 | 94 |
| 6 | 250 | 28 | 9.2 | 2.3 | 2.3 | 0.27 | 88 |
| 7 | 255 | 25 | 7.8 | 1.6 | 2.3 | 0.29 | 88 |
| 8 | 270–275 | 38 | 7.7 | 2.6 | 2.8 | 0.14 | 95 |
| 9 | 270–275 | 36 | 7.3 | 2.5 | 3.0 | 0.11 | 96 |
| 10 | 270–275 | 32 | 8.2 | 2.9 | 2.7 | 0.12 | 95 |
| 11 | 270–275 | 32 | 8.2 | 2.9 | 2.7 | 0.16 | 94 |
| 12 | 270–275 | 32 | 12.8 | 4.4 | 1.9 | 0.04 | 99 |
| 13 | 250–285 | 31 | 14.1 | 4.8 | 1.3 | 0.02 | 99 |
| 14 | 270–275 | 36 | 12.5 | 4.1 | 1.6 | 0.02 | 99 |
| 15 | 265–270 | 41 | 12.8 | 4.3 | 1.5 | 0.03 | 99 |
| 16 | 275–280 | 38 | 12.4 | 4.4 | 1.9 | 0.02 | 99 |
| 17 | 275–280 | 38 | 10.8 | 3.7 | 2.4 | 0.04 | 99 |

I claim:
1. In a process for distilling a volatile constituent from a liquid mixture of immiscible materials, the steps of heating said mixture to a temperature in the range of from about 250° F. to about 275° F. while said mixture is in a flowing state and at a superatmospheric pressure, substantially and abruptly reducing the major portion of the superatmospheric pressure of said mixture to rapidly vaporize a constituent of said mixture, immediately thereafter conducting said mixture and vaporized constituent through a relatively long turbulent passage while simultaneously continuously reducing the pressure to provide heat for further vaporizing a constituent of said mixture, reducing the pressure of said mixture to atmospheric pressure at the outlet end of said turbulent passage and separating the vapors from the remaining liquid, condensing said vapors to obtain a condensate, and separating said volatile constituent from the carrier constituent in said condensate.

2. In a process according to claim 1 wherein the pressure of said mixture is reduced to a value in the range of from about 10 psig to about 15 psig prior to the conduction thereof through said turbulent passage.

* * * * *